US009875569B2

(12) United States Patent
Yu et al.

(10) Patent No.: US 9,875,569 B2
(45) Date of Patent: Jan. 23, 2018

(54) UNIFIED 3D VOLUME RENDERING AND MAXIMUM INTENSITY PROJECTION VIEWING BASED ON PHYSICALLY BASED RENDERING

(71) Applicant: Siemens Healthcare GmbH, Erlangen (DE)

(72) Inventors: Daphne Yu, Yardley, PA (US); Feng Qiu, Pennington, NJ (US); Lining Yang, East Windsor, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 53 days.

(21) Appl. No.: 15/063,632

(22) Filed: Mar. 8, 2016

(65) Prior Publication Data

US 2017/0236324 A1 Aug. 17, 2017

Related U.S. Application Data

(60) Provisional application No. 62/295,817, filed on Feb. 16, 2016.

(51) Int. Cl.
*G06T 15/06* (2011.01)
*G06T 15/08* (2011.01)
*G06T 7/00* (2017.01)

(52) U.S. Cl.
CPC ............. *G06T 15/06* (2013.01); *G06T 15/08* (2013.01); *G06T 2210/41* (2013.01)

(58) Field of Classification Search
CPC ..... G06T 15/06; G06T 7/0012; G06T 2210/41; G06T 15/08; A61B 6/5223
See application file for complete search history.

(56) References Cited

U.S. PATENT DOCUMENTS

| 2007/0140537 A1* | 6/2007 | Heigl | G06T 15/08 |
| | | | 382/128 |
| 2012/0177258 A1* | 7/2012 | Hakl | G06T 15/08 |
| | | | 382/128 |

OTHER PUBLICATIONS

Hauser et al. "Two-level Volume Rendering—Fusing MIP and DVR." Proceedings, Visualization 2000, Oct. 8, 2000, 8 pages.*
Csebfalvi et al. "Monte Carlo Volume Rendering." IEEE Visualization, Oct. 19, 2003, pp. 449-456.*
Kim et al. "Interactive Point-of-Interest Volume Rendering Visualization of PET-CT Data." IEEE Nuclear Science Symposium Conference Record, Oct. 19, 2008, pp. 4384-4387.*
Fishman, Elliot K., et al. "Volume rendering versus maximum intensity projection in CT angiography: what works best, when, and Why1." Radiographics (2006).

* cited by examiner

*Primary Examiner* — Jon Chang

(57) ABSTRACT

In rendering in medical imaging, the MIP and VRT modes are emulated using physically-based rendering, such as Monte Carlo ray tracing. By weighting the rendering based on user or other input, where along a continuum of MIP to VRT to render is selected. A sequence of different images may be rendered with different settings at different points on the continuum using the same window level, classification, or other parameters.

19 Claims, 2 Drawing Sheets

UNIFIED 3D VOLUME RENDERING AND MAXIMUM INTENSITY PROJECTION VIEWING BASED ON PHYSICALLY BASED RENDERING

BACKGROUND

The present embodiments relate to rendering in medical imaging. For three-dimensional visualization, different rendering approaches provide different information to assist the physician in diagnosis or treatment. Two common approaches are the volume rendering technique (VRT) mode and the maximum intensity projection (MIP) mode.

In traditional volume rendering (e.g., VRT by ray cast or other object oriented techniques), each pixel of the final image is sampled along the viewing direction as a direct function of collected samples within the viewing volume. In VRT, each image sample on the viewing direction of one pixel is classified as a color sample then composited to the final image. In MIP, the sample with the maximum value is assigned to one pixel of the final image.

MIP mode is often used for examining vasculatures in contrast enhanced computed tomography images since almost all contrast-enhanced vessels may be viewed in a single image to assess conditions of stenosis, plaque, and stents. MIP renders a great overview of the data, and the noise in the data is naturally filtered out due to lower intensities of noise voxels. However, MIP mode viewing may be misleading in terms of depth perception. Direction and relations between curved vasculature may appear incorrectly placed or connected, especially when multiple vascular branches overlap on the image.

VRT mode provides a view of the objects after image intensities are globally classified into colors. VRT offers better perception of depth and provides good structural understanding as compared to MIP, but suffers from too much occlusion from unimportant voxels and noise and suffers from lack of conspicuity.

Due to the different qualities, VRT and MIP are often both used to make a clinical assessment. However, these two modes are traditionally completely separate entities, each offering different information and tradeoffs but also different configurations of window levels, classification, and other parameters. The user is faced with reconfiguring to switch modes. Even where switching is simpler, the user views both separately or in sequence. The user has to imagine the physical condition of the reviewed structures from the two views.

BRIEF SUMMARY

By way of introduction, the preferred embodiments described below include methods, systems, instructions, and computer readable media for rendering in medical imaging. The MIP and VRT modes are emulated using physically-based rendering, such as Monte Carlo ray tracing. By weighting the rendering based on user or other input, where along a continuum of MIP to VRT to render is selected. A sequence of different images may be rendered with different settings at different points on the continuum using the same window level, classification, or other parameters.

In a first aspect, a method is provided for rendering in medical imaging. A medical scanner scans a volume of a patient. The scanning provides intensities representing the volume. A user setting of a rendering variable mapping to relative contribution of maximum intensity projection to volume rendering is received. An image is rendered from the intensities representing the volume of the patient with ray tracing. The rendering is a function of the user setting of the rendering variable. The image is transmitted.

In a second aspect, a non-transitory computer readable storage medium has stored therein data representing instructions executable by a programmed processor for rendering in medical imaging. The storage medium includes instructions for: receiving a value indicating density weighting; solving for probabilities of interaction of photons with intensities representing different locations in a volume; weighting the probabilities based on the value; and rendering an image to a display, the rendering using the probabilities of interaction as weighted.

In a third aspect, a system is provided for rendering in medical imaging. A medical imaging system is configured to scan an internal region of a patient and generate voxel data representing a volume comprising the internal region. A user interface is configured to receive user input along a continuum from maximum intensity projection to volume rendering technique. The continuum includes at least three settings, one of the three settings comprising a combination emulating contribution from both the maximum intensity projection and the volume rendering technique. A renderer is configured to physically render an image from the voxel data. The render is configured to physically render as a function of the user input such that the image emulates with the physically rendering a relative contribution of the maximum intensity projection and the volume rendering technique based on the setting along the continuum. A display is configured to display the image output by the renderer, the image representing the internal region.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Physically-based rendering unifies VRT and MIP viewing. VRT and MIP modes are rendered as a continuum based on physically-based rendering techniques. By allowing this continuum to be rendered and smoothly transitioned between the two modes, the physical structure being reviewed may be better understood. Physically-based rendering or ray tracing with unified handling of both MIP and VRT modes enables rendering of an image with a tradeoff of MIP and VRT information (e.g., tradeoff of noise reduction of MIP and depth perception of VRT) using one rendering mode. A user input may be used to set the contribution of both modes being emulated (e.g., MIP and VRT).

Figure 1:
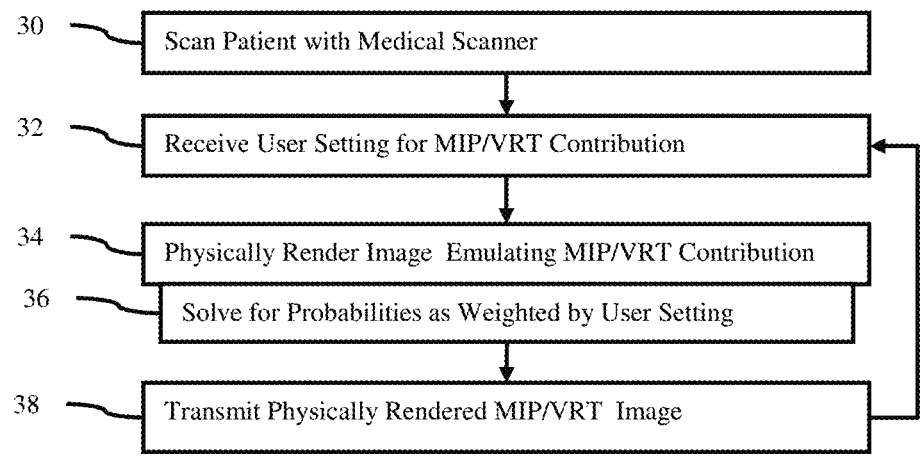
FIG. 1 is a flow chart diagram of one embodiment of a method for rendering in medical imaging.

FIG. 1 shows a method for rendering in medical imaging. Physically-based rendering, such as ray tracing, is used to render images from a scan volume. Relative amounts of emulation of MIP and VRT are provided by altering the physically-based rendering. The probability of scattering or other rendering parameter is altered, such as weighting the probability based on similarity of a given intensity to a maximum intensity for a ray. The weighting alters the physically-based rendering to render an image more like MIP, more like VRT, or along a continuum between MIP and VRT.

Figure 4:
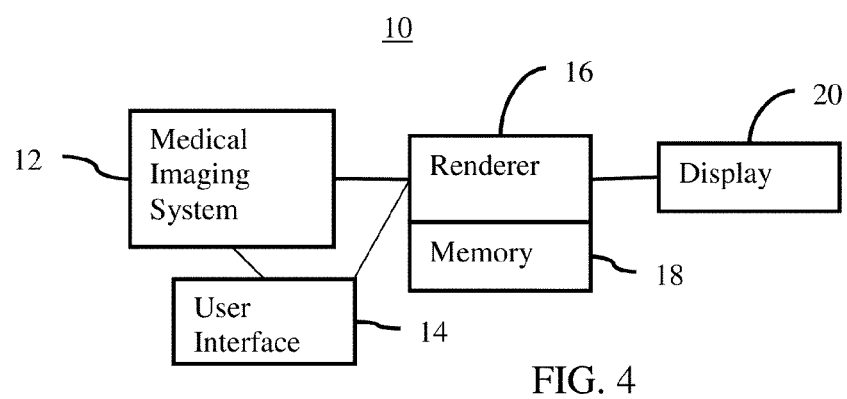
FIG. 4 is a block diagram of one embodiment of a system for rendering in medical imaging.

The method is implemented by the system 10 of FIG. 4 or another system. For example, act 30 is performed by a medical scanner, act 32 is performed by a user input or interface, and acts 34-38 are performed by a renderer. Any one or more of the acts may be performed by different devices.

The acts are performed in the order shown or other orders. For example, acts 30 and 32 are performed in the order shown, a reverse order, or simultaneously. Act 38 may be performed as part of act 34.

Additional, different, or fewer acts may be provided. For example, the setting is loaded from memory in act 32 rather than being received from the user. As another example, user input is provided for interacting with the rendering. In yet another example, act 30 is not performed. Instead, the scan data is loaded from a memory.

The method is performed once to generate an image. The current setting controls the relative contribution of the emulation of MIP to VRT. The setting of the emulation or contribution of MIP relative to VRT may be adjusted. Another image is generated, but with different relative contribution or emulation. The image is generated from the same scan data or volume. In other embodiments, the method is repeated in real-time with an on-going acquisition in medical imaging, such as imaging moving anatomy. Repetition may be provided for interactive rendering and/or representing an object moving in the patient. Acts 30 and 34-38 are repeated in real-time with acquisition of addition samples, alteration of rendering, or combinations thereof. Act 32 is not repeated or may be repeated where the user makes an adjustment to the relative contribution.

In act 30, a medical scanner acquires a set of voxels. The set represents a volume of the patient. A volume of a patient is scanned with the medical scanner. The interior of the patient is scanned, such as with magnetic resonance (MR), x-ray (e.g., CT), ultrasound, or emission tomography (e.g., PET or SPECT). The scan is performed in any format, such as detecting emissions along lines of response, acquiring k-space data at magnetic gradient defined locations, or acquiring projections through the patient with x-rays from different directions.

A renderer or the medical imaging system reconstructs a volume representing, at least in part, the internal portion of the patient. Any reconstruction from the scan data may be used. Tomography or other process may be used to determine intensities for different locations distributed in three dimensions. As a result of the scan, data representing the interior of the patient in an N×M×O region or volume is acquired, where N, M, and O are integers greater than 1. The reconstruction determines scalar values or intensities for each of a plurality of voxels distributed in three dimensions.

In alternative embodiments, the intensities are classified as color. For example, a classification or transform function is applied to convert the intensities to red, green, blue, opacity (RGBα) or color values. The color values are used instead of intensities.

The intensities represent response from blood, tissue, bone, other object, and/or contrast agents in the patient. In one embodiment, the voxel data is computed tomography data representing a cardio-vascular system or blood or contrast agent in vessels and/or the heart of the patient. Other information may be included, such as response from tissue.

In act 32, a user input or interface receives a user setting of a rendering variable mapping relative contribution between MIP and VRT. A single parameter or variable is used to set the relative contribution. The physically-based rendering emulates the different relative contributions based on the user input of the single variable. The setting maps to the different relative contributions, such as a higher setting indicating emulation more of the MIP than the VRT and a lower setting indicating emulation more of the VRT than the MIP. Since the physically-based rendering emulates MIP, VRT, and combinations thereof, a single parameter may be input to indicate where along the continuum the user desires for the rendered image at a given time.

More than one variable may be used as user inputs to set the relative contribution in other embodiments. In an alternative to user input, a setting is acquired from memory or provided from a source other than the user. Instead of user setting, a default, predetermined, or application-specific setting is used.

In one embodiment, the input variable indicates a density weighting. In ray tracing, the density at a given location may alter the probability of scattering, emission, and/or absorption. By weighting the density, the probability is increased or decreased. MIP corresponds to a greater probability of interaction at the maximum intensity along a ray. Intensities closer to the maximum correspond to higher density, so the probability is greater at the higher intensities. VRT corresponds to a more uniform density. The density weighting is more uniform across the intensities for VRT and less uniform for MIP. More uniform density distribution maintains the variance from the intensities without emphasizing for greater intensities. Transitioning between a normal VRT and a MIP is possible via the use of a function to favor the weighting between a uniform density value for all samples versus weighting to favor a high density value for values closer to the maximum value.

In act 34, a renderer renders an image from the intensities representing the volume of the patient. The three-dimensional distribution of voxels or intensities is rendered to a two-dimensional image for display. The pixel values of the two-dimensional image are determined from the voxel values of the three-dimensional distribution. The pixels values may then be used on the two-dimensional screen or display. The image is rendered to the display, but may be rendered and provided to a memory or network.

The rendering uses ray tracing. Ray casting projects rays through a volume and examines the intensities along each ray to create a pixel value for the image. For example, in MIP, the maximum intensity along each ray is found and used. As another example, in VRT, the intensities along the ray are combined in a weighted average, where the weight is based on opacity or magnitude of the intensity. Conversely, ray tracing is used in physically-based rendering. Rays are projected from each pixel. Light photons are simulated along each of the rays. The scattering, absorption, and/or emission of the light photons may be simulated. Many photons are simulated for each ray. The color or intensity resulting from the scattering, absorption, and/or emission along each ray is calculated. This ray tracing may be used to unify VRT and MIP viewing.

To physically render the image in act 34, probabilities are solved for in act 36. The probabilities model the interaction of the photons with intensities for the different locations in the volume. For example, Monte Carlo emulation of the photon interaction is used in the rendering. In Monte Carlo-based physical rendering, contribution from the volume samples to the final image are based on simulation of interactions between light photons projected from the viewpoint to the volume structure along the ray paths. The probabilities are solved for along each of a plurality of rays traced from pixels with Monte Carlo ray tracing.

Figure 2:
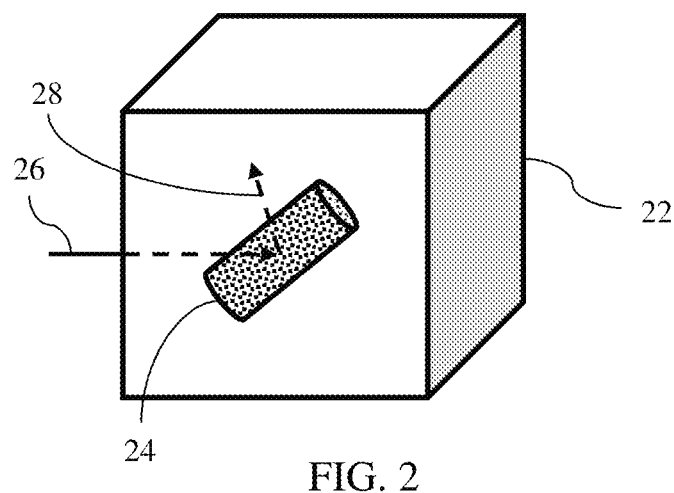
FIG. 2 illustrates an example embodiment of a volume and a ray.

FIG. 2 shows an example. A ray 26 is traced from a pixel or view into the volume 22. The ray 26 intersects tissue. For a given photon, the photon may pass through some tissue, but the Monte Carlo simulation indicates a scattering event at one location. The photon then travels in a different direction, ω', along ray line 28. For other photons along the ray 26, the scattering may occur at other locations or not at all, depending on the probabilities. By combining the simulation from many photons, the value for the pixel is determined.

The photon interaction may be modeled based on any one or more probabilities. For example, the probability of absorption, probability of scattering, and/or probability of emission are modeled. In one embodiment, there are three forms of photon-volume interactions: absorption—light absorbed by the volume, emission—light emitted from the volume, and scattering—light direction changed by the volume. Each light photon could scatter to a random direction when the photon encounters the samples within the volume. According to a random probability, which is a function of the volume intensity, the photon may also be absorbed and thereby not contribute to the final image. The scattering probability and the new photon direction are computed with a function of the density of the encountered sample (e.g., the phase function). The following differential equation accounts for these interactions:

$$\frac{dI(x, \omega)}{ds} = -\sigma_t(x, \omega)I(x, \omega) + \sigma_e(x, \omega)I(x, \omega) + \sigma_s(x, \omega)\int_\Omega f(x, \omega, \omega')I(x, \omega')d\omega' \quad \text{(Eqn. 1)}$$

where x is the spatial location in the volume where interaction is being modeled, ω and ω' are the ray path direction for the ray from the pixel and after scattering, respectively, $\sigma_t(x, \omega)$ is the absorption probability function, $\sigma_e(x, \omega)$ is the emission probability function, $\sigma_s(x, \omega)$ is the scattering probability function, and $f(x, \omega, \omega')$ is the phase function. Other representations may be used for modeling the interaction, such as using fewer probabilities. In an alternative embodiment, the probability of scattering is modeled in the Monte Carlo simulation without Monte Carlo simulation of emission and/or absorption.

The probability functions in the equation are a function of the three-dimensional sampling position. For each position that a photon intersects, the probability of interaction is calculated. As the photon travels along the ray path, including or not including scattering, the probabilities of interaction are determined.

The differential equation does not have any analytic solution. The Monte Carlo ray tracing method is applied to get the numerical solution. Other approaches using random generation or other technique may be used. Multiple photons are shot from each pixel to the scene and interact with the volume. As the number of photons increases, the average light intensities accumulated for photons converge to the numerical solution of the pixel color or intensity. In medical visualization, the probability functions may be simplified to be a one-dimensional function of the volume intensity at the sampling position.

The physically-based rendering is a function of the setting for relative contribution. For example, the user setting of the rendering variable indicating position along the MIP to VRT continuum controls the rendering. The control is by weighting one or more of the probabilities. Different weights and/or no weights may be used for some of the probabilities. In one embodiment, the setting is used to weight the scattering probability. The value of the user input controls the weight.

The intensity of the encountered sample may be assigned based on a variety of sampling decisions based on what is important to the particular use case, such as the probability of scattering. Whichever sampling decision is used in the modeling, the setting is used to influence this sampling strategy to favor or disfavor the maximum intensity value along the ray. Favoring the maximum intensity results in the image appearing more like a traditional MIP image. For every photon emitted from a pixel in the Monte Carlo ray tracing approach, a straight line is defined with the pixel position in three-dimensional space and the projection direction or the viewpoint position (e.g., traced ray 26 of FIG. 2). The line segment inside the volume 22 is sampled to compute the maximum intensity $d_{max}$ on the line or ray 26 without determining any scattering.

When tracing the photon inside the volume, one or more of the probability functions defined in equation 1 are weighted by the intensity d at the sampling position and the maximum intensity $d_{max}$. For example, a weighted absorption probability is represented as: $\sigma'_t(x, \omega) = w(d, d_{max})\sigma_t(x, \omega)$, where w is the weighting function.

Any weighting function using the maximum intensity may be used. The user setting or value of the relative contribution is also included. The weighting function may or may not include a difference between the intensity at a given location and the maximum intensity along the ray passing through that location. Other variables may be included. An average or other intensity value than the maximum (e.g., average of the highest third of intensity values) may alternatively be used.

In one embodiment, the weighting function is an exponential function. The user setting is part of the exponent, but may be included in terms other than the exponent. For each location along a ray, the probability of interaction is weighted. The weight is different for each location where a location specific term is included, such as the intensity at that location. For example, the weight is a function of the setting, a maximum intensity along a line through the intensities representing the volume, and an intensity at a location in the volume of intensities. One example weighting function is:

$$w(d, d_{max}) = 1 - (1 - e^{-k*f(d, d_{max})})$$

where the value k is a value used as the variable controlling the weight between MIP and VRT rendering. k is mapped from the user or other setting. For instance, a slider bar user interface maps directly to this parameter to provide a smooth transition between a MIP important sampled physically-based rendering verses a normal VRT physically-based rendering.

The function $f(d, d_{max})$ may be a distance function between the sample intensity value to the maximum intensity value. Other functions may be used, such as a ratio or product. Different types of distance functions may be used depending on the nature of the data. In one embodiment, $f(d, d_{max})=C(d_{max})-C(d)$ where $C(d)$ represents the classified alpha, $\alpha$, value color mapped from intensity of the sample and $C(d_{max})$ represents the classified alpha value color mapped from the maximum intensity along the ray. Other functions for f may be used.

In alternative embodiments, other functions for weighting may be used. Rather than an exponent, other setting controlled linear or non-linear mappings of the maximum intensity to weight may be used.

With a positive distance function value (e.g., $d_{max}-d$) (i.e., $f(d, d_{max})$ is assumed to be positive) and $0 < w \leq 1$, the probability function is partially weighted to increase or not the probability for sample values closer to $d_{max}$. By altering the probability of interaction based on difference from the maximum intensity, the emulation of MIP verses VRT is altered. For example, lower values of the setting k reduce the influence of similarity of intensity to the maximum intensity, emulating VRT. When k=0, $w(d, d_{max})$ becomes 1, and the probability function is unchanged. By not changing the probability of interaction, the outcome is a normal physically-rendered VRT. VRT usually provides better depth perception than MIP. However, occlusion may also happen.

When k is greater than 0 but less than a very large number, $0 < w < 1$, the probability function is partially weighted to increase the probability of interaction for sample values closer to $d_{max}$. The weight is proportional to the difference between sampling intensity and maximum intensity. This is the rendering result between traditional Monte-Carlo ray tracing and MIP or between VRT and MIP. This case is a combination of MIP and VRT. The relative amount of the combination is based on k. The maximum value along the ray weights the Monte-Carlo ray tracing probability function. A VRT-like result is rendered, but influenced by the maximum intensity along the ray. The contribution of MIP and VRT may be varied. This combination of VRT and MIP may give the user somewhat correct depth perception, although not as accurate at some positions as the normal Monte-Carlo ray tracing rendered without weighting using the maximum intensity. The combination may also reduce the noise of the image and make the image appear "cleaner." In addition, the combination reduces the occlusion and reveals structures that have high maximum intensity values even if the structures are behind other structure.

When k is very large or infinite, $k*f(d, d_{max}) \to \infty$, $w(d, d_{max})$ approaches 1 at the maximum intensity. In other words, the weight is 1 at the MIP position (i.e., sample with maximum intensity along the ray) and 0 everywhere else. This means that the probability of occurrence happens at the MIP position and not elsewhere. This use case renders an image closest to the traditional MIP rendering. The image may be different than an MIP as the sample location still scatters at the MIP position instead of just using the MIP value for the final rendering. However, the resulting physically-based rendering has many of the MIP characteristics. The image has poor depth perception. The high intensity structures always pop in front even though the high intensity structures are physically behind other structure. This emulation of MIP helps a user to see structure information (e.g., stenosis) even though the depth perception is not correct.

The emulation of MIP also reduces the noise to a similar level as a normal MIP rendered image.

Other weighting may be used, such as weights with a range greater than 1. Any resolution along the continuum of weights may be used, such as providing for three or more settings of k. The user may prioritize depth perception over noise reduction and/or structure information but desire both.

In act 38, the rendered image is transmitted. The transmission is to a display, such as a display buffer. The output of the display buffer to the display generates the image for viewing. The rendered image or images are displayed by the renderer on the display. The image represents the patient. Alternatively, the image is transmitted to a network or memory, such as a picture archiving communications system.

The feedback from act 38 to act 32 represents adjusting the relative contribution. The image is rendered again with a different weighting. The user adjusts the setting, such as to emulate more or less MIP relative to VRT. The image of the volume is re-rendered from the intensities so that the contribution between MIP and VRT is different. The same intensities or voxel data are used. In alternative embodiments, subsequently acquired voxel data in a real-time rendering is used for re-rendering.

Figures 3A, 3B, 3C:
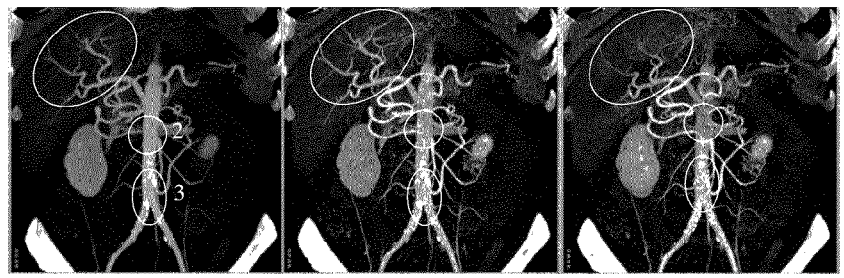
FIG. 3A shows a MIP projection image.
FIGS. 3B-D show three example images physically rendered with different probability weights.
Figure 3D:
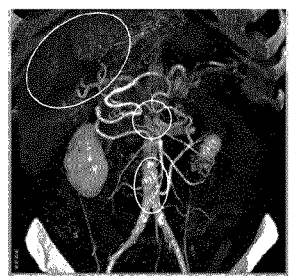

FIGS. 3A-D are rendered from the same voxel data of a CT scan of an abdomen. FIG. 3A is a traditional MIP image. FIGS. 3B-D show physically-based rendered images generated using the direct distance function $f(d, d_{max})$ above applied to scattering, $\sigma'_s(x, \omega) = w(d, d_{max}) \sigma_s(x, \omega)$. FIG. 3B uses a value of k=2000, so has an appearance similar to FIG. 3A. At k=2000, the image possesses similar characteristics in the highlighted circled regions regarding the vasculature and plaque as in the normal MIP image (FIG. 3A). FIG. 3C uses a value of k=10 so provides a mix of MIP and VRT. FIG. 3D uses a value of k=0, so resembles a VRT image. When k=0 (i.e., the normal physically-based VRT), the highlighted region correctly depicts the structure and depth perception of the vasculature but the plaque is occluded.

FIG. 4 shows one embodiment of a system 10 for rendering in medical imaging. The system 10 renders a volume of a patient for medical visualization. Ray tracing or other physically-based rendering unifies rendering of MIP and rendering without MIP. Using the same transfer function, classification, windowing, and/or other rendering parameters, one parameter of the rendering is altered to adjust the rendering to be more or less responsive to the maximum intensity along each ray path. For example, the probability of interaction is increased or not for intensities at or near the maximum, emulating MIP or not in the rendering.

The system 10 includes a medical imaging system 12, a user interface or input 14, a renderer 16, a memory 18, and a display 20. Additional, different, or fewer components may be provided. For example, a network or network connection is provided, such as for networking with a medical imaging network or data archival system. As another example, the user interface 14 is not provided, and the setting for controlling relative contribution of MIP to VRT is loaded from memory or predetermined.

The user interface 14, renderer 16, memory 18, and display 20 are part of the medical imaging system 12. Alternatively, the user interface 14, renderer 16, memory 18, and/or display 20 are part of an archival and/or image processing system, such as associated with a medical records database workstation or server. In other embodiments, the user interface 14, renderer 16, memory 18, and/or display 20 are a separate computer, such as desktop or laptop, a workstation, a server, a network, or combinations thereof. The user interface 14, renderer 16, memory 18, and display 20 may be parts of different systems, such as the memory 18 being in a picture archiving and communications system (PACS), the renderer 16 being part of a workstation, and/or the display 20 being an imaging system or radiological display.

The system 10 is configured to implement the method of FIG. 1. Alternatively, other methods are implemented.

Any medical imaging system 12 may be used. For example, the medical imaging system 12 is a CT, MR, ultrasound, x-ray, fluoroscopy, or emission tomography (i.e., functional imaging such as PET or SPECT) system. The medical imaging system 12 is any now known or later developed medical imaging system for scanning an interior of the patient. The medical imaging system 12 is configured by hardware, firmware, and/or software to scan the internal region of a patient and generate voxel data representing a scanned volume of the internal region.

The medical imaging system 12 is configured to scan an internal region of the patient. The surface or skin of the patient may or may not also be scanned. Any portion or extent of the patient may be scanned, such as a scan of an organ, torso, extremity, or full body. The scan acquires data representing the interior of the patient. The represented portion includes a volume or three-dimensional distribution of response from the patient. FIG. 2 shows an internal region 22 as a cube, but the scanned volume of the patient may have any shape.

The medical imaging system 12 is configured to scan the patient to acquire at least one set of data. The set or frame of data represents the internal region of the patient at a specific time or period. A static volume is acquired. Alternatively, the scanning is repeated or performed in an ongoing manner to acquire a sequence of sets of voxel data. Each set represents the volume at a given time or period, so the sequence represents the volume over time (3D+t or 4D data). Any frame or volume rate may be provided. For real-time rates, at least 10 volumes or sets of voxel data are acquired each second. Greater or lesser volume rates may be provided.

The scan data may be output as a 3D reconstruction or data representing a volume. Alternatively, the acquired scan data is reconstructed to represent the volume. For example, Fourier processing is applied to k-space data in MR to reconstruct the volume. As another example, computed tomography is used to reconstruct the volume (e.g., SPECT or CT). In yet another example, data representing three dimensions in a scan format is interpolated to a regular or other grid, such as a Cartesian coordinate grid. Each datum is associated with a different volume location (voxel) in the patient volume and assigned a scalar intensity.

The data from the scan is formatted as voxels in an isotropic grid. For example, voxels in a 512×512×512 Cartesian grid are used. Anisotropic grids may be used. Other formats may be used, such as the data representing locations in a polar coordinate format. For each voxel or location, a scan response is provided by a scalar value (e.g., 16 bit dynamic range), but other representations may be used, such as RGBα values.

Given the number of different types of medical imaging systems 12, different workflows, different clinical applications, and use for diagnosis or treatment, there is a large variety in the voxel data and characteristics of the voxel data in medical imaging. Any one or more sets of voxel data representing intensity of return, density, attenuation, elasticity, motion, uptake, temperature, molecular spin response, other characteristics, or combinations thereof may be acquired by the medical imaging system 12.

The user interface 14 is an input device with or without an output. Any input may be used, such as keyboard, button, slider, knob, track pad, mouse, track pad, or other sensor. The output may be on the display 20, an LED, light, or other output.

The user interface 14 is configured to receive input from the user. The input may configure the rendering. The user inputs a value or values for any number of rendering parameters, such as view direction, type of lighting, visual effect, or transfer function. For example, the user may interactively change one or more values of a setting. In one embodiment, the user rotates or alters the view direction for rendering. In other embodiments, the user selects the imaging application (e.g., cardiac imaging), resulting in loading of default settings. In alternative embodiments, a processor or the renderer 16 uses default or determined values for one, more, or all of the settings.

When a setting is changed due to interaction, the rendering is performed again using the new setting. By rapidly re-rendering, such as at real-time rates, the interaction may appear more smooth or appealing to the user. The images prior to and after adjustment use the same un-adjusted parameter values for other parameters for rendering. For example, a change in viewing direction is performed, but the windowing, classification, and/or other rendering parameters are preserved (e.g., values the same).

In one embodiment, the user interface 14 is configured to receive user input along a continuum from MIP to VRT. A slider, rotating knob, menu selection, or other input indicates the relative contribution between MIP and VRT desired by the user. The continuum includes at least three settings, such as including five, ten, or more settings over a range of different relative contributions. The range may begin with MIP (e.g., k=very large number) and end with VRT (e.g., k=0 or very small number) or vice versa. Any step size in between the end and the beginning may be used. The settings in between the beginning and the end are for a combination emulating contribution from both the MIP and the VRT. The end and/or the beginning may also be a combination.

The renderer 16 is a general processor, central processing unit, control processor, graphics processor, digital signal processor, three-dimensional rendering processor, image processor, application specific integrated circuit (ASIC), field programmable gate array (FPGA), digital circuit, analog circuit, combinations thereof, or other now known or later developed device for rendering an image from data. The renderer 16 is a single device or multiple devices operating in serial, parallel, or separately. The renderer 16 may be a main processor of a computer, such as a laptop or desktop computer, or may be a processor for handling some tasks in a larger system, such as in an imaging system. The renderer 16 is configured by hardware, firmware, and/or software.

In one embodiment, the renderer 16 is a graphics processing unit (GPU) or a graphics card with rendering code. A set of graphics cards may be used. A GPU is a massively parallel computation device. CUDA or OpenCL languages are used to program the GPU. In other embodiments, the x86-based Xeon Phi or custom FPGA/ASIC implementations are used. One side effect of the ray-tracing pipeline is that the computations are generally performed per pixel in screen space, allowing for efficient scaling with multiple computational devices. Multiple GPUs in a render node, GPU clusters, CPU/GPU hybrid systems, or other computational architectures may be used. Sample-based, tile-based, or frame-based distribution of the rendering may be used.

The renderer 16 is configured to physically render an image from the voxel data. Any physical rendering may be used, such as ray tracing and Monte Carlo solution. The physical rendering uses a physics model, such as for photon or other path tracing, to render. Rays are traced from each of a plurality of pixels for the image, and the interaction of the light photon with the volume is modeled. For example, probabilities are used to model interaction.

The rendering by the renderer 16 is based, in part, on the user input or other setting of the relative contribution of MIP to VRT. The setting is used to weight the probabilities of the Monte Carlo solution. The setting may alter other ray-tracing rendering. To more closely emulate MIP, the physically-based rendering increases the probability of interaction at locations with intensities at or close to the maximum intensity along the same ray. Alternatively or additionally, the probability of interaction for locations with intensities less than or more different from the maximum is decreased. The maximum of the voxel data along each given ray of the ray tracking with or without scattering is used for weighting the probability of interaction for locations along that ray.

The renderer 16 is configured to physically render as a function of the setting along the continuum such that the image emulates, with the physically-based rendering, a relative contribution of the MIP and the VRT. By using different settings, the influence of intensities at or close to the maximum intensity changes. This results in the image being more or less like MIP. The less like MIP, the more like VRT. Any range of relative contributions and corresponding settings to render the emulation of the relative contribution may be used. Any step size with uniform or non-uniform steps for assigning the relative contribution may be used.

Since one or a few parameters are adjusted to change the relative contribution, other parameters may be preserved. Rather than changing the type of rendering, the same type (i.e., physically-based) of rendering is used for any of the relative contributions. The window level, classification, transfer function, and/or other rendering parameters that may typically change in switching between MIP and VRT are maintained the same despite changes in or different relative contributions. A traditional MIP image may need to be windowed leveled differently from the traditional VRT image, making comparison difficult. By using physically-based rendering for both, most or all parameters, including window level, are preserved between various values of k, making comparison smooth and understandable.

By having a continuum, an image with some of the advantages of both MIP and VRT may be rendered. The benefit to the end user is that, compared to the completely separate VRT and MIP rendering, the user may assess the qualities beneficial from VRT and MIP as a continuum. By changing the setting, a single view is provided at different times of the volume. The context and perception is preserved for the different images for better visual understanding. Furthermore, the physically-based MIP image possesses the qualities of a single pass traditional MIP image, but further provides a better structural understanding of some of the structures possessing the maximum intensity through light and shading properties.

The renderer 16 generates an image or sequence of images representing the internal region of the patient. For example, one of the images of FIGS. 3B-D is output. A given image represents the internal region at a specific time or period. The sequence of images may be for a static volume with different relative contribution settings or for real-time imaging over time with different relative contribution settings. The generated images are scalar values or display color values (e.g., RGB) for pixels of the images. The images are output by transfer or loading into a display buffer.

The display 20 is configured to display the image output by the renderer 16. The display 20 is a monitor, LCD, projector, plasma display, CRT, printer, or other now known or later developed devise for outputting visual information. The display 20 is configured by receiving images, graphics, or other information from the renderer 16, memory 18, or medical imaging system 12.

The display 20 receives the image rendered from the volume scan. The image is output to the user. The image includes emulation of a relative amount of MIP to VRT. The image output by the renderer 16 is based on the physically-based rendering altered to include one of a varying amount of MIP or maximum intensity responsiveness. The image represents the internal region of the patient, but with MIP and VRT considerations.

In one embodiment, the image changes over time, such as due to user interaction or on-going acquisition of medical scan data. For example, the user configures the renderer 16 for rendering a volume using ray tracing with Monte Carlo solution. The user or other source indicates the relative contribution between MIP and VRT to be included in the image. The resulting image is displayed. The user may change the relative contribution without changing other settings, and the image is rendered to the display again but with a different relative contribution of MIP to VRT. One rendered image is replaced with another rendered image based on the change in relative contribution.

The memory 18 is a graphics processing memory, video random access memory, random access memory, system memory, cache memory, hard drive, optical media, magnetic media, flash drive, buffer, database, combinations thereof, or other now known or later developed memory device for storing data. The memory 18 is part of the medical imaging system 12, part of a computer associated with the renderer 16, part of a database, part of another system, or a standalone device.

The medical scan data, reconstructions, voxel data, frames, rendering, settings, and/or images are stored. Any data used for imaging or data in beginning, intermediate, or final stages of processing are stored for access by the renderer 16.

The memory 18 or other memory is a computer readable storage medium storing data representing instructions executable by the programmed renderer 16 for rendering in medical imaging. The instructions for implementing the processes, methods, and/or techniques discussed herein are provided on computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for rendering in medical imaging, the method comprising:
   scanning a volume of a patient with a medical scanner, the scanning providing intensities representing the volume;
   receiving a user setting of a rendering variable mapping to relative contribution of maximum intensity projection to volume rendering;
   rendering an image from the intensities representing the volume of the patient with ray tracing, the rendering being a function of the user setting of the rendering variable and the rendering with ray tracing comprising modeling a probability of absorption, a probability of scattering, and/or a probability of emission, wherein the user setting of the rendering variable weights at least one of the probabilities; and
   transmitting the image.

2. The method of claim 1 wherein scanning comprises scanning with computed tomography, positron emission tomography, single photon emission computed tomography, x-rays, magnetic resonance, or ultrasound.

3. The method of claim 1 wherein scanning the volume comprises obtaining the intensities representing a three-dimensional distribution of locations in the volume, and wherein rendering comprises rendering to the image as a two-dimensional distribution of pixels from the three-dimensional distribution.

4. The method of claim 1 wherein receiving the user setting comprises receiving the user setting of the rendering variable as a single variable for the mapping.

5. The method of claim 1 wherein rendering the image with ray tracing comprises rendering with Monte Carlo emulation of photon interaction with the intensities representing the volume.

6. The method of claim 1 wherein modeling comprises modeling the probability of scattering, wherein the user setting weights the probability of scattering.

7. The method of claim 1 wherein the weighting is a function of the user setting, a maximum intensity along a line through the intensities representing the volume, and an intensity at a location in the volume of intensities.

8. The method of claim 1 wherein rendering comprises emulating greater contribution as the volume rendering with lower values of the user setting and emulating greater contribution as the maximum intensity projection with greater values of the user setting.

9. The method of claim 1 wherein transmitting comprises transmitting to a display and displaying the image.

10. The method of claim 1 wherein the image comprises a first image, further comprising receiving an adjustment of the user setting and re-rendering a second image of the volume from the intensities using the adjustment such that a the contribution is different in the second image than the first image.

11. A non-transitory computer readable storage medium having stored therein data representing instructions executable by a programmed processor for rendering in medical imaging, the storage medium comprising instructions for:
    receiving a value indicating a weighting of density of intensities from medical imaging;
    solving for probabilities of interaction of photons with the intensities representing different locations in a volume of a patient in the medical imaging;
    weighting the probabilities based on the value; and
    rendering a medical image to a display, the rendering using the probabilities of interaction as weighted.

12. The non-transitory computer readable storage medium of claim 11 wherein receiving the value comprises receiving user selection of relative contribution of maximum intensity projection and volume rendering, the weighting of the density being more uniform across the intensities for the volume rendering and less uniform for the maximum intensity projection such that the higher densities are for the intensities closer to a maximum intensity for the maximum intensity projection.

13. The non-transitory computer readable storage medium of claim 11 wherein solving for the probabilities comprises solving for a scattering probabilities along each of a plurality of rays traced from pixels with Monte Carlo ray tracing.

14. The non-transitory computer readable storage medium of claim 11 wherein weighting comprises weighting with an exponential function, the value being part of an exponent, the exponent for each location being a function of maximum intensity along a ray through that location and an intensity at the location.

15. The non-transitory computer readable storage medium of claim 14 wherein the function of the exponent uses classified alpha values of color terms for the intensity and the maximum intensity.

16. A system for rendering in medical imaging, the system comprising:
    a medical imaging system configured to scan an internal region of a patient and generate voxel data representing a volume comprising the internal region;
    a user interface configured to receive user input along a continuum from maximum intensity projection to volume rendering technique, the continuum including at least three settings, one of the three settings comprising a combination emulating contribution from both the maximum intensity projection and the volume rendering technique;
    a renderer configured to physically render an image from the voxel data, the renderer configured to physically render using a probability of photon absorption, a probability of photon scattering, and/or a probability of photon emission in interaction with the voxel data, and the renderer configured to physically render as a function of the user input such that the image emulates with the physically rendering a relative contribution of the maximum intensity projection and the volume rendering technique based on the setting along the continuum;
    a display configured to display the image output by the renderer, the image representing the internal region.

17. The system of claim 16 wherein the renderer is configured to render using any of the at least three settings with a same window level and a same classification table such that as the user interface receives different ones of the settings as the user input, the image is rendered with the same window level and the same classification table but with the relative contribution being different.

19. The system of claim 16 wherein the renderer is configured to physically render with ray tracing and Monte Carlo solution from each of a plurality of pixels for the image, the user input used to weight the probabilities of the Monte Carlo solution for each ray of the ray tracing.

19. The system of claim 18 wherein weights for the probabilities are each a function of a maximum of the voxel data along each ray of the ray tracing.

* * * * *